United States Patent
Kim et al.

(10) Patent No.: US 10,091,198 B2
(45) Date of Patent: Oct. 2, 2018

(54) RULE-BASED FINGERPRINT GENERATION METHODS AND APPARATUS

(71) Applicant: KOREA INTERNET & SECURITY AGENCY, Seoul (KR)

(72) Inventors: Hwan Kuk Kim, Seoul (KR); Tae Eun Kim, Seoul (KR); Dae Il Jang, Seoul (KR); Eun Hye Ko, Seoul (KR); Jee Soo Jurn, Seoul (KR); Sa Rang Na, Seoul (KR); Eun Byul Lee, Seoul (KR)

(73) Assignee: KOREA INTERNET & SECURITY AGENCY, Seoul (KR)

( * ) Notice: Subject to any disclaimer, the term of this patent is extended or adjusted under 35 U.S.C. 154(b) by 0 days.

(21) Appl. No.: 15/811,048

(22) Filed: Nov. 13, 2017

(65) Prior Publication Data
US 2018/0145978 A1     May 24, 2018

(30) Foreign Application Priority Data
Nov. 22, 2016    (KR) ........................ 10-2016-0155601

(51) Int. Cl.
*H04L 29/06*       (2006.01)
*H04L 29/12*       (2006.01)
*H04L 12/801*      (2013.01)

(52) U.S. Cl.
CPC ........ *H04L 63/0876* (2013.01); *H04L 47/193* (2013.01); *H04L 61/2007* (2013.01); *H04L 69/16* (2013.01)

(58) Field of Classification Search
CPC . H04L 63/0876; H04L 61/2007; H04L 69/16; H04L 47/193
See application file for complete search history.

(56) References Cited

U.S. PATENT DOCUMENTS

| | | | | |
|---|---|---|---|---|
| 2007/0171836 | A1* | 7/2007 | Yoshimi | H04L 29/1249 370/250 |
| 2014/0257997 | A1* | 9/2014 | Bullock | G06Q 30/0273 705/14.69 |

(Continued)

FOREIGN PATENT DOCUMENTS

| | | |
|---|---|---|
| KR | 10-2005-0005763 A | 1/2005 |
| KR | 10-2016-0073209 A | 6/2016 |
| KR | 10-1679578 B1 | 11/2016 |

OTHER PUBLICATIONS

Hjelmvik, Erik. Passive OS Fingerprinting. NETRESEC, Nov. 5, 2011, [retrieved on Jan. 18, 2018]. Retrieved from the Internet: < URL: http://www.netresec.com/?page=Blog&month=2011-11&post=Passive-OS-Fingerprinting>, pp. 1-3. (Year: 2011).*

(Continued)

*Primary Examiner* — Omar J Ghowrwal
(74) *Attorney, Agent, or Firm* — Studebaker & Brackett PC

(57) ABSTRACT

A device information gathering method is provided. The device information gathering method includes: allowing a device information gathering apparatus to transmit a packet to a randomly generated Internet Protocol (IP) address and to receive a syn-ack packet as a response; allowing the device information gathering apparatus to parse the syn-ack packet and thus to extract Transmission Control Protocol (TCP)/IP fields; and allowing the device information gathering apparatus to compare the TCP/IP fields and an OS fingerprint rule, which is in JavaScript Object Notation (JSON) format, and thus to generate an OS fingerprint of the randomly generated IP address, wherein the OS fingerprint rule stores Operating Systems (OSs) and TCP/IP field values corresponding to versions of the OSs as attribute-value pairs.

8 Claims, 16 Drawing Sheets

(56) References Cited

U.S. PATENT DOCUMENTS

2016/0359872 A1* 12/2016 Yadav .................... H04L 43/04
2017/0041333 A1* 2/2017 Mahjoub ............. H04L 61/1511

OTHER PUBLICATIONS

An Office Action; "Notice of Allowance," issued by the Korean Intellectual Property Office dated Aug. 22, 2017, which corresponds to Korean Patent Application No. 10-2016-0155601.
An Office Action; "Notification of Reason for Refusal," issued by the Korean Intellectual Property Office dated Apr. 10, 2017, which corresponds to Korean Patent Application No. 10-2016-0155601.
Internet Protocol. In Wikipedia, The Free Encyclopedia. Retrieved 16:33, Apr. 23, 2018, from https://en.wikipedia.org/w/index.php?title=Internet_Protocol&oldid=837014999.
Transmission Control Protocol. In Wikipedia, The Free Encyclopedia. Retrieved 16:35, Apr. 23, 2018, from https://en.wikipedia.org/w/index.php?title=Transmission_Control_Protocol&oldid=837716892.
JSON. In Wikipedia, The Free Encyclopedia. Retrieved 16:35, Apr. 23, 2018, from https://en.wikipedia.org/w/index.php?title=JSON&oldid=837597488.
File Transfer Protocol. In Wikipedia, The Free Encyclopedia. Retrieved 16:36, Apr. 23, 2018, from https://en.wikipedia.org/w/index.php?title=File_Transfer_Protocol&oldid=837172883.
Secure Shell. In Wikipedia, The Free Encyclopedia. Retrieved 16:36, Apr. 23, 2018, from https://en.wikipedia.org/w/index.php?title=Secure_Shell&oldid=833485297.
Telnet. In Wikipedia, The Free Encyclopedia. Retrieved 16:37, Apr. 23, 2018, from https://en.wikipedia.org/w/index.php?title=Telnet&oldid=821772929.
Simple Mail Transfer Protocol. In Wikipedia, The Free Encyclopedia. Retrieved 16:37, Apr. 23, 2018, from https://en.wikipedia.org/w/index.php?title=Simple_Mail_Transfer_Protocol&oldid=835508299.
Hypertext Transfer Protocol. In Wikipedia, The Free Encyclopedia. Retrieved 16:38, Apr. 23, 2018, from https://en.wikipedia.org/w/index.php?title=Hypertext_Transfer_Protocol&oldid=837778113.
Post Office Protocol. In Wikipedia, The Free Encyclopedia. Retrieved 16:38, Apr. 23, 2018, from https://en.wikipedia.org/w/index.php?title=Post_Office_Protocol&oldid=833066388.
Internet Message Access Protocol. In Wikipedia, The Free Encyclopedia. Retrieved 16:38, Apr. 23, 2018, from https://en.wikipedia.org/w/index.php?title=Internet_Message_Access_Protocol&oldid=837104180.
Session Initiation Protocol. In Wikipedia, The Free Encyclopedia. Retrieved 16:39, Apr. 23, 2018, from https://en.wikipedia.org/w/index.php?title=Session_Initiation_Protocol&oldid=837266242.
Real Time Streaming Protocol. In Wikipedia, The Free Encyclopedia. Retrieved 16:39, Apr. 23, 2018, from https://en.wikipedia.org/w/index.php?title=Real_Time_Streaming_Protocol&oldid=822545245.

* cited by examiner

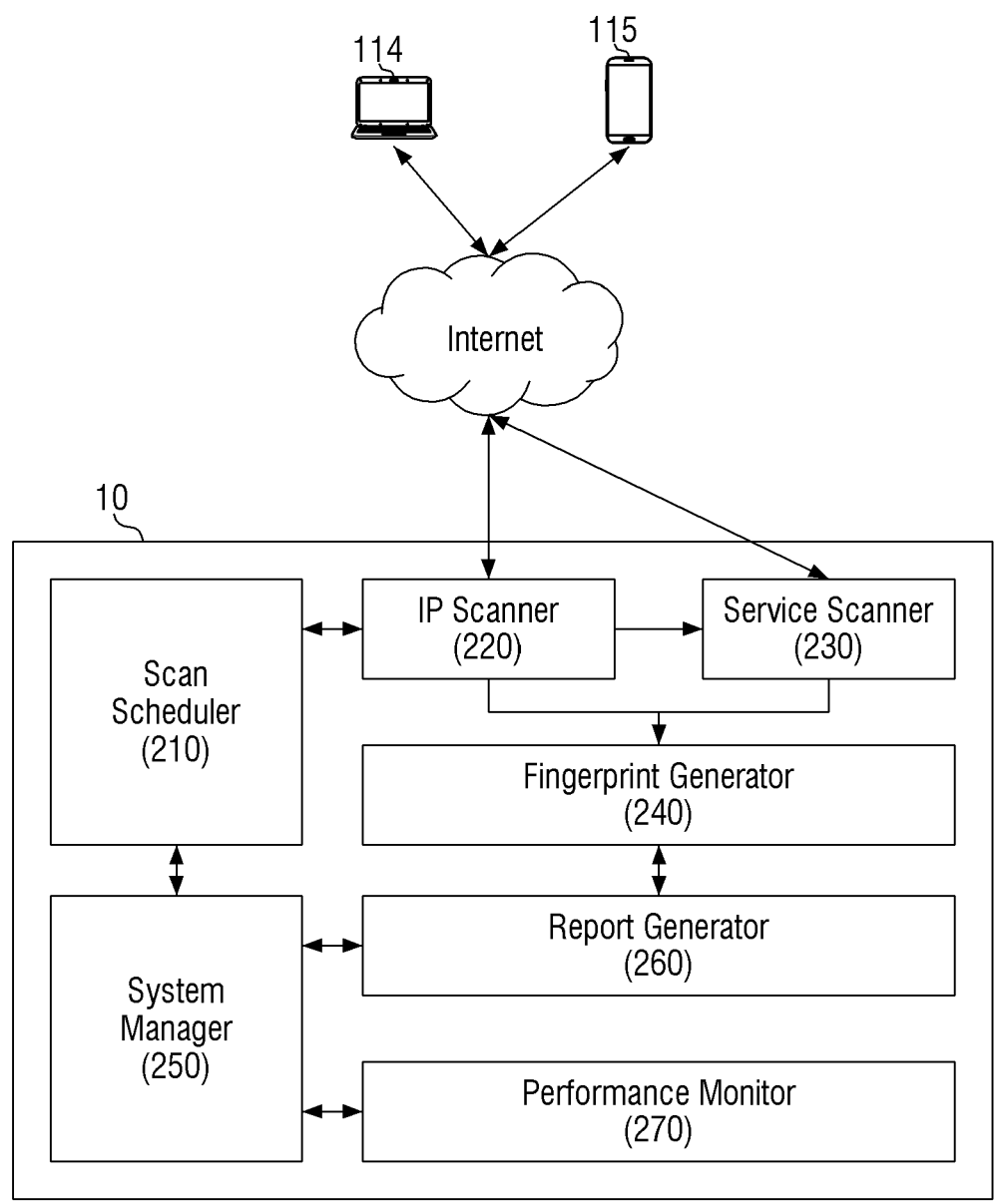

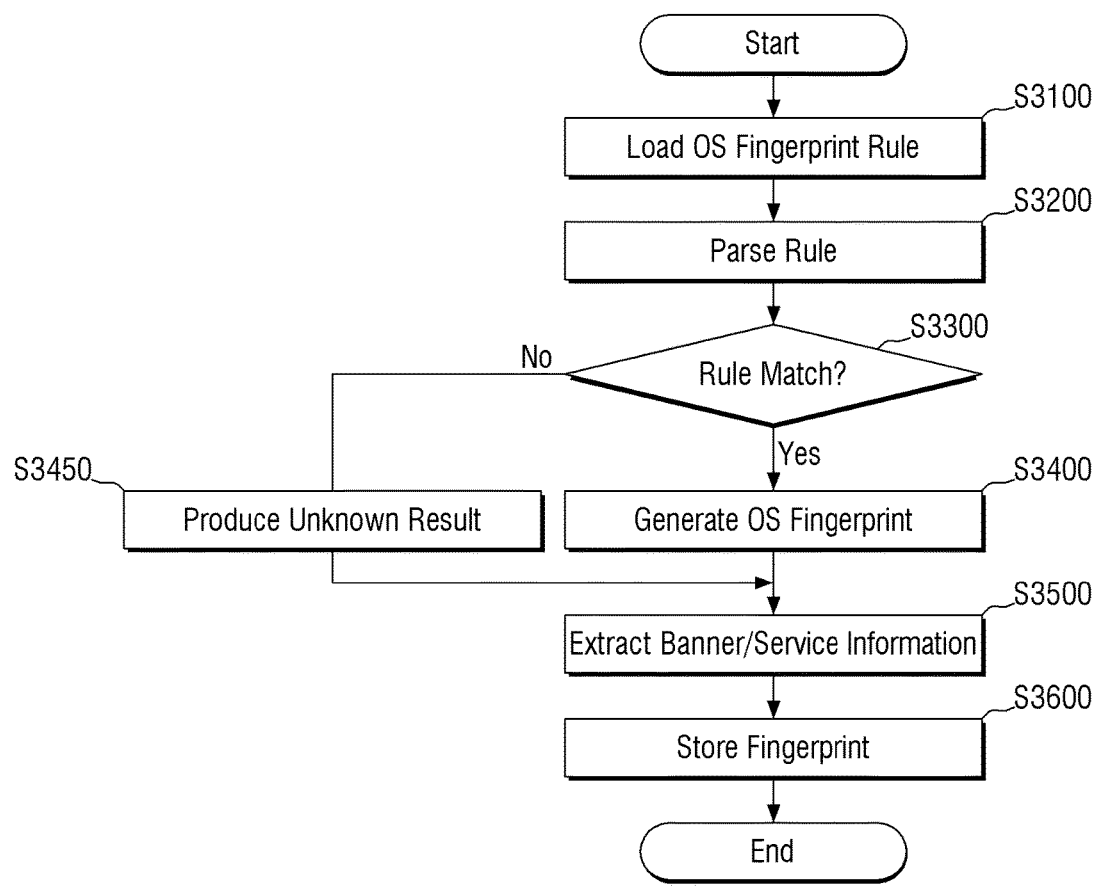

FIG. 8A

```
{
    "saddr" : "186.182.95.60",
    "success" : true,
    "ttl" : 107,
    "ip_hl" : 5,
    "ip_v" : 4,
    "ip_tos" : 0,
    "ip_len" : 11264,
    "ip_p" : 6,
    "ip_sum" : 8670,
    "window" : 8192,
   "mss" : 1460
},
{
    "saddr" : "186.182.95.60",
    "success" : true,
    "ttl" : 43,
    "ip_hl" : 5,
    "ip_v" : 4,
    "ip_tos" : 0,
    "ip_len" : 11264,
    "ip_p" : 6,
    "ip_sum" : 21547,
    "window" : 14600,
   "mss" : 1460
},
{
    "saddr" : "186.182.95.60",
    "success" : true,
    "ttl" : 43,
    "ip_hl" : 5,
    "ip_v" : 4,
    "ip_tos" : 0,
    "ip_len" : 11264,
    "ip_p" : 6,
    "ip_sum" : 8670,
    "window" : 5840,
   "mss" : 1460
},
...
```

FIG. 8B

```
{
  "ip" : "74.116.246.162",
  "timestamp" : "2016-05-03 04:27:50 04:00",
  "data" :
  {
    "telnet" :
    {
      "banner" : "\r\n\r\nUser Access Verification\r\n\r\nUsername : ",
      "will" :
      [
        {
          "name" : "Echo",
          "value" : 1
        },
        {
          "name" : "Suppress Go Ahead",
          "value" : 3
        }
      ],
      "do" :
      [
        {
          "name" : "Terminal Type",
          "value" : 24
        },
        {
          "name" : "Negotiate About Window Size",
          "value" : 31
        }
      ]
    }
  }
}
```

FIG. 9A

```
{
  "OS Fingerpnnt" : "",
  "ip" : "91.53.243.99",
  "OS rule" :
  {
    "IP" :
    {
      "type_of_service" : 0,
      "version" : 4,
      "checksum" : 10041,
      "header_length" : 5,
      "ttl" : 48,
      "total_length" : 11264,
      "ip_protocol" : 6
    },
    "TCP" :
    {
      "window_size" : 5840,
      "MSS" : 1452
    }
  }
}
```

FIG. 9B

```
{
  "OS Fingerpnnt" : "",
  "ip" : " 115.79.235.57",
  "OS rule" :
  {
    "IP" :
    {
       "type_of_service" : 64,
       "version" : 4,
       "checksum" : 63277
       "header_length" : 5,
       "ttl" : 43,
       "total_length" : 11264,
       "ip_protocol" : 6
    },
    "TCP" :
    {
       "window_size" : 14600,
       "MSS" : 1452
    },
    "time stamp" : "2016-10-24 17:36:48 09:00",
    "data" : "RTSP/1.0 451 ERRORrnServer : H264DVR 1.0rnrn",
    "port" : "554"
  }
},
...
```

FIG. 10A

```
# Rule based OS fingerprint
Windows7
{
   IP {ttl=128;},
   TCP {window_size=8192;}
},
reeBSD
{
   IP {ttl=64;},
   TCP {window_size=65535; MSS=512;}
}

# Rule based Service fingerprint
Apache 2.3
{
   HTTP {field_name1=value; field_name2=value;}
},
OpenSIP
{
   SIP{field_name1=value; field_name2=value; field_name3=value;}
}
```

FIG. 10B

```
{
    "ip":"74.116.246.162",
    "timestamp":"2016- 05- 03T04:27:50- 04:00",
    "OS Fingerprint":"FreeBSD",
    "OS rule":{
        "IP":{"ttl"="64"},
        "TCP":{"window_size"="65535",
               "MSS"="512"
        },
    },
    "Service Fingerprint":"telnet- 0.17- 31.EL4.3",
    "Service rule": {
        ///////////Input in the same manner as OS Rule/////////////////
    },
    "data":{
```

RULE-BASED FINGERPRINT GENERATION METHODS AND APPARATUS

This application claims priority to Korean Patent Application No. 10-2016-0155601, filed on Nov. 22, 2016, and all the benefits accruing therefrom under 35 U.S.C. § 119, the disclosure of which is incorporated herein by reference in its entirety.

BACKGROUND

1. Field

The present disclosure relates to a rule-based fingerprint generation method and apparatus, and more particularly, to a method of scanning numerous Internet of Things (IoT) devices connected to the Internet and generating a fingerprint for gathering information based on a rule and an apparatus performing the method.

2. Description of the Related Art

According to the statistics published by CISCO and HEWLETT-PACKARD (HP), the world's population was 6.8 billion in 2010, compared to the 1.25 billion Internet-enabled devices available, and in 2015, the world's population was projected to reach 7.2 billion, while the number of Internet-enabled devices was projected to reach 25 billion.

This trend was expected to further increase, and the world's population and the number of Internet-enabled devices were expected to reach 7.6 billion and 50 billion, respectively, in 2020 and 8.1 billion and one trillion, respectively, in 2025. Given this, it is safe to say that there has been, and will be, an explosion in the number of IoT devices, as compared to the growth of the world's population.

As the number of IoT devices increases exponentially, many problems are emerging in association with IoT devices. For example, the news article, titled "*Your Privacy Is Broadcast Live. Damage by Search Engine A Is Widespread*," show that home hackers used the initial passwords of web cams installed in each home to intercept, through IoT search engine A, videos taken by the web cams. This type of incident is believed to happen because IoT devices are generally less secure than typical computers.

In order to address this and other similar problems, the security vulnerabilities of IoT devices may be detected and prevented. That is, there is the need to analyze security vulnerability information such as Common Vulnerabilities and Exposure (CVE) or Common Weakness Enumeration (CWE) of IoT devices.

The detection and analysis of the security vulnerabilities of IoT devices require information on IoT devices to be gathered in advance. That is, information indicating what IoT device is connected via what Internet Protocol (IP) address needs to be gathered in advance. By doing so, the vulnerabilities of each IoT device at each IP address can be analyzed and properly handled. Therefore, a device information gathering method specialized for IoT devices is needed.

SUMMARY

Exemplary embodiments of the present disclosure provide a rule-based fingerprint generation method and an apparatus performing the rule-based fingerprint generation method.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment of the present disclosure, there is provided a device information gathering method, the method comprises allowing a device information gathering apparatus to transmit a packet to a randomly generated Internet Protocol (IP) address and to receive a syn-ack packet as a response, allowing the device information gathering apparatus to parse the syn-ack packet and thus to extract Transmission Control Protocol (TCP)/IP fields and allowing the device information gathering apparatus to compare the TCP/IP fields and an OS fingerprint rule, which is in JavaScript Object Notation (JSON) format, and thus to generate an OS fingerprint of the randomly generated IP address, wherein the OS fingerprint rule stores TCP/IP field value corresponding to Operating Systems (OS) and version of the OS as attribute-value pair.

According to another exemplary embodiment of the present disclosure, there is provided the device information gathering method, the method further comprises allowing the device information gathering apparatus to transmit a packet corresponding to the protocol of a predetermined port of the randomly generated IP address to the predetermined port and to receive traffic as a response, allowing the device information gathering apparatus to extract banner information and service information from the traffic and allowing the device information gathering apparatus to compare the banner information and the service information with a service fingerprint rule, which is in JSON format, and thus to generate a service fingerprint of the predetermined port, wherein the service fingerprint rule stores application providing service and value of the banner information and the service information corresponding to version of the application as attribute-value pair.

According to another exemplary embodiment of the present disclosure, there is provided the device information gathering method, wherein the port is one of File Transfer Protocol (FTP), Secure Shell (SSH), TELNET, Simple Mail Transfer Protocol (SMTP), Domain Name System (DNS), HyperText Transfer Protocol (HTTP), Post Office Protocol version 3 (POP3), Internet Message Access Protocol (IMAP), Session Initiation Protocol (SIP), and Real Time Streaming Protocol (RTSP) ports.

According to another exemplary embodiment of the present disclosure, there is provided the device information gathering method, the method further comprises allowing the device information gathering apparatus to provide the OS fingerprint and the service fingerprint in JSON format.

According to another exemplary embodiment of the present disclosure, there is provided the device information gathering method, the method further comprises allowing the device information gathering apparatus to schedule the transmission of a packet corresponding to the protocol of the predetermined port to the predetermined port.

According to another exemplary embodiment of the present disclosure, there is provided the device information gathering method, wherein the allowing the device information gathering apparatus to transmit a packet to the randomly generated IP address and to receive a syn-ack packet as a response, comprises randomly generating an IP address belonging to a first IP address range and adding the randomly generated IP address to a hit-list for the first IP address range.

According to another exemplary embodiment of the present disclosure, there is provided the device information gathering method, the method further comprises allowing the device information gathering apparatus to schedule the transmission of a packet to the randomly generated IP address.

According to an exemplary embodiment of the present disclosure, there is provided a device information gathering apparatus that comprises an IP scanner transmitting a packet to a randomly generated IP address and receiving a syn-ack packet as a response and a fingerprint generator extracting TCP/IP fields by parsing the syn-ack packet, the fingerprint generator generating an OS fingerprint of the randomly generated IP address by comparing the TCP/IP fields and an OS fingerprint rule, which is in JSON format, wherein the OS fingerprint rule stores TCP/IP field value corresponding to OS and version of the OS as attribute-value pair.

According to another exemplary embodiment of the present disclosure, there is provided the device information gathering apparatus that further comprises a service scanner transmitting a packet corresponding to the protocol of a predetermined port of the randomly generated IP address to the predetermined port and receiving traffic as a response, wherein the fingerprint generator extracts banner information and service information from the traffic and generates a service fingerprint of the predetermined port by comparing the banner information and the service information with a service fingerprint rule, which is in JSON format, and the service fingerprint rule stores value of the banner information and the service information corresponding to application providing service and versions of the application as attribute-value pair.

According to another exemplary embodiment of the present disclosure, there is provided the device information gathering apparatus that further comprises a scheduler scheduling the transmission of a packet to the randomly generated IP address and the transmission of a packet corresponding to the protocol of the predetermined port of the randomly generated IP address to the predetermined port.

According to the aforementioned and other exemplary embodiments of the present disclosure, a fingerprint of an IoT device can be created by performing an IP scan and a service scan. Specifically, in order to prevent a bottleneck phenomenon and the possibility of being blocked by other security equipment, a random IP address is generated, and an IP scan is performed using the random IP address, instead of sequentially scanning all IP addresses. If the random IP address is active, a service scan is performed on the random IP address.

In addition, an IP scan and a service scan can be scheduled. Also, by using an IP scan result and a service scan result, a fingerprint of an IoT device can be generated. Since a fingerprint of an IoT device is generated based on a rule, information on the IoT device can be easily gathered.

Other features and exemplary embodiments may be apparent from the following detailed description, the drawings, and the claims.

BRIEF DESCRIPTION OF THE DRAWINGS

The above and other exemplary embodiments and features of the present disclosure will become more apparent by describing in detail exemplary embodiments thereof with reference to the attached drawings, in which:

FIG. 2 is a schematic view illustrating the configuration of the IoT device information gathering apparatus according to an exemplary embodiment of the present disclosure;

FIG. 7 is a flowchart illustrating the fingerprint generation method according to an exemplary embodiment of the present disclosure;

FIGS. 8A and 8B show an IP scan result and a service scan result that can be used in some exemplary embodiments of the present disclosure;

FIGS. 9A and 9B show an Operating System (OS) fingerprint and a scan result report that can be used in some exemplary embodiments of the present disclosure; and FIGS. 10A and 10B show a rule for generating an OS fingerprint and a fingerprint result obtained by the rule.

DETAILED DESCRIPTION

Figure 1:
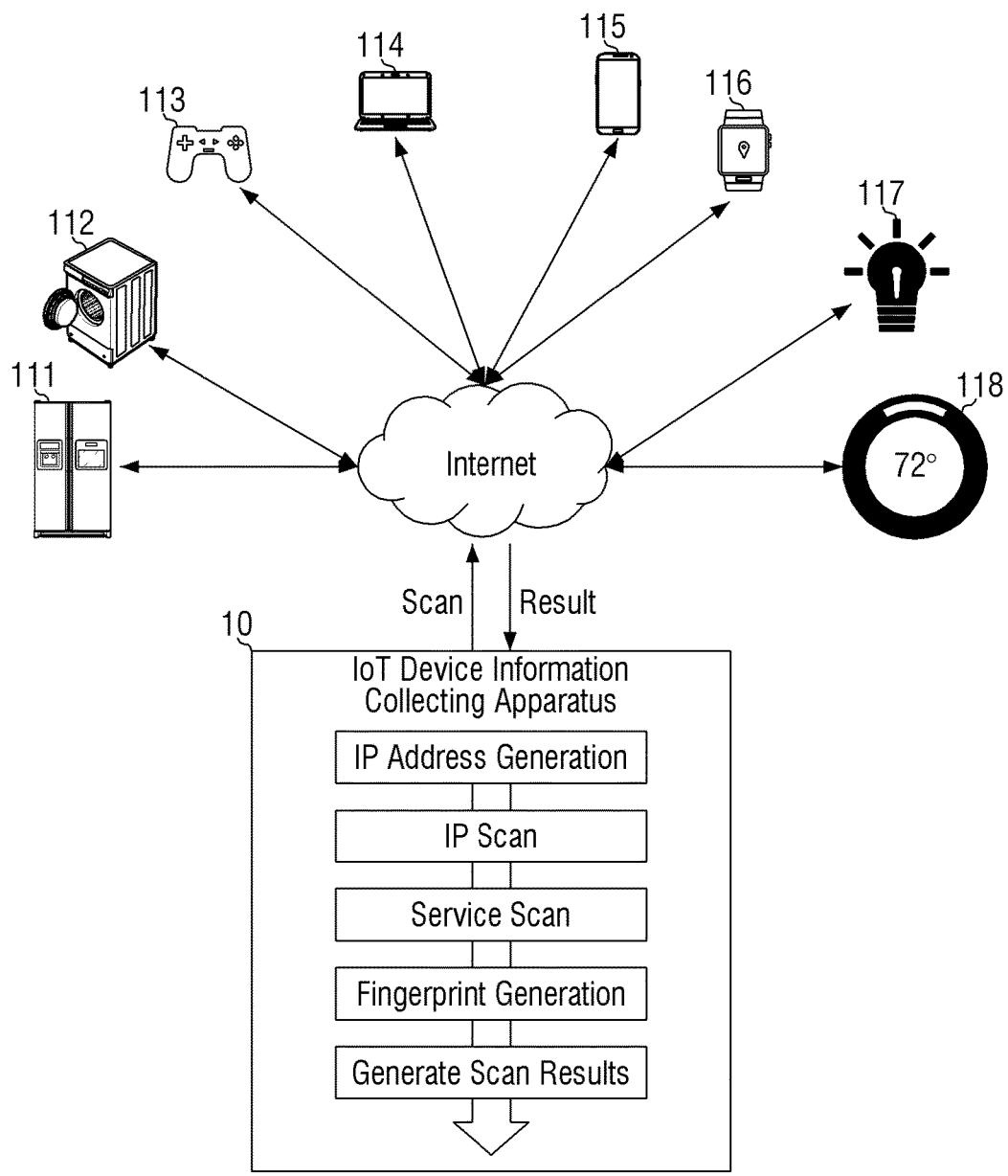
FIG. 1 is a schematic view illustrating the functions of an Internet of Things (IoT) device gathering apparatus according to an exemplary embodiment of the present disclosure.

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

First, terms used in the present disclosure will hereinafter be described. As used herein, the term "Internet Protocol (IP) scan" denotes generating a hit list for a designated Internet Protocol version 4 (IPv4) address range. That is, an IP scan involves transmitting a packet to a randomly generated IP address and scanning whether there exists an Internet of Things (IoT) device corresponding to the randomly generated IP address.

As used herein, the term "service scan" denotes scanning ports corresponding to an IP address that is determined as being active based on an IP scan result. That is, a service scan involves determining whether ports of a particular IP address are currently providing a service. The number of ports to be service-scanned is not particularly limited, but service information may be acquired for 15 protocols that are commonly used.

As used herein, the term "scan scheduling" denotes scheduling IP scans and service scans. An IP scan involves scanning IP addresses of a designated address range, and there are often thousands (or even tens of thousands) of IP scans to be performed. Since a service scan checks 15 protocols for each IP address, the number of service scans to be performed is generally much greater than the number of IP scans to be performed. Thus, IP scans and service scans need to be appropriately scheduled to be effectively performed, and this scheduling is referred to as scan scheduling.

As used herein, the term "fingerprint generation" denotes defining a fingerprint based on a rule, particularly, a process of generating a fingerprint of an IoT device using an IP scan result and a service scan result. That is, a Transmission Control Protocol (TCP)/IP packet-based Operating System (OS) fingerprint may be generated using an IP scan result, and a service banner-based service fingerprint may be generated using a service scan result.

As used herein, the term "performance monitoring" denotes measuring the speeds of an IP scan and a service scan and scan progress and response rates. That is, performance monitoring refers to a process of monitoring the performance of an IoT device information gathering apparatus. Performance monitoring may be used in scan scheduling.

As used herein, the term "system management" denotes the function of managing the system resources of the IoT device information gathering apparatus, such as central processing unit (CPU), disk, and memory usages, and detecting any process errors. System management can effectively monitor and manage the operation of each module of the IoT device information gathering apparatus.

Exemplary embodiments of the present disclosure will hereinafter be described.

FIG. 1 is a schematic view illustrating the functions of an IoT device information gathering apparatus according to an exemplary embodiment of the present disclosure.

Referring to FIG. 1, an IoT device information gathering apparatus 10 gathers information on various IoT devices 111 through 118 connected to the Internet. For example, the IoT devices 111 through 118 include a refrigerator 111, a washing machine 112, a game machine 113, a computer 114, a smartphone 115, a smart watch 116, a lamp 117, and a heater 118.

Obviously, there may be various IoT devices other than those illustrated in FIG. 1. For example, a variety of devices such as door locks, windows, inductors, air conditioners, televisions, and smart bands provide Internet-based services.

The IoT devices 111 through 118 of FIG. 1 are merely exemplary, and the present disclosure is not limited thereto.

The IoT device information gathering apparatus 10 is an apparatus scanning the IP addresses and ports of the IoT devices 111 through 118 via the Internet and storing the results of the scanning using a fingerprint. The IoT devices 111 through 118 are connected to the Internet in various manners such as wired and wireless manners. The IoT devices 111 through 118 provide services by being connected to the Internet and are thus essential to have IP addresses. Thus, the IoT device information gathering apparatus 10 is basically for gathering information regarding what IoT device exists at each particular IP address.

To this end, a particular range of IP addresses is created. For example, in the case of IPv4, IP addresses ranging from 0.0.0.0 to 127.255.255.255 may be checked. A target IP address range to be checked may be designated in various manners. If the target IP address range is not designated, an IP scan may be performed on all IP addresses.

If the target IP address range is designated as being from 0.0.0.0 to 127.255.255.255, the sequential scanning of the IP addresses 0.0.0.0 to 127.255.255.255 may cause various problems. That is, if the IP address 0.0.0.0 is scanned first, then the IP address 0.0.0.1 is scanned, then the IP address 0.0.0.2 is scanned, . . . , and then the IP address 127.255.255.255 is scanned, a bottleneck phenomenon may occur because of scan traffic for each unit network. Also, the sequential scanning of the IP addresses 0.0.0.0 to 127.255.255.255 may be perceived as a Distributed Denial of Service (DDoS) attack by other security equipment, and as a result, the IoT device information gathering apparatus 10 may be blocked by other security equipment.

Therefore, it is necessary to generate a random IP address within a designated address range to perform an IP scan. If the designated address range is from 0.0.0.0 to 127.255.255.255, the IP addresses 0.0.0.0 to 127.255.255.255 may be scanned in random order. For example, the IP address 0.0.0.0 may be scanned first, then the IP address 119.203.20.23 may be scanned, and then the IP address 60.41.0.2 may be scanned. In the case of scanning IP addresses in random order, it is highly important to perform scheduling to identify which IP addresses have already been scanned and which IP addresses have not yet been scanned. This will be described later with reference to FIGS. 3A through 3G.

Referring again to FIG. 1, a random IP address is generated, and a packet is transmitted to the generated IP address to determine whether the generated IP address is responsive. That is, the generated IP address is scanned to determine whether the generated IP address is active. If the generated IP address is active, a service scan is performed for a minimum of 15 ports for the generated IP address.

Thereafter, a fingerprint may be generated using an IP scan result and a service scan result. Specifically, the fingerprint may be generated based on rules, and a result of the generating may be provided in JavaScript Object Notation (JSON) format. Here, JSON format is an open standard format that uses human-readable text to transmit a data object consisting of an attribute-value pair and is a data format that can replace eXtensible Markup Language (XML) (used by Asynchronous JavaScript and XML (AJAX)) for Asynchronous JavaScript and JSON (AJAJ).

FIG. 2 is a schematic view illustrating the configuration of the IoT device information gathering apparatus according to an exemplary embodiment of the present disclosure.

Referring to FIG. 2, the computer 114 and the smartphone 115 are provided as exemplary IoT devices. Specifically, for convenience, only some of the IoT devices 111 through 118 of FIG. 1 are illustrated in FIG. 2. The IoT device information gathering apparatus 10 may be used to gather information on the IoT devices 114 and 115, which are connected to the Internet.

The IoT device information gathering apparatus 10 may include an IP scanner 220, a service scanner 230, and a scan scheduler 210, which performs scheduling between the IP scanner 220 and the service scanner 230. The IoT device information gathering apparatus 10 may further include a fingerprint generator 240, which generates a fingerprint using scan results, and a report generator 260, which generates a report using results of the scan and the generating the fingerprint. The IoT device information gathering apparatus 10 may further include a system manager 250 and a performance monitor 270.

The elements of the IoT device information gathering apparatus 10 will be described later in detail with reference to FIGS. 3A through 3G. The IoT device information gathering apparatus 10 of FIG. 2 may scan IP addresses and ports and may store and manage the results of the scanning, which may be used later for identifying the vulnerabilities of the IoT devices 114 and 115.

By using the IoT device information gathering apparatus 10, IP addresses and ports may be scanned. The scanning of IP addresses may be performed by randomly generating an IP address in order to prevent the occurrence of a bottleneck phenomenon that may be caused by scan traffic for each unit network and to prevent the IoT device information gathering apparatus 10 from being blocked by other security equipment.

Once an IP address is randomly generated and is verified as being active, TCP/IP fields are extracted from the generated IP address, and the extracted TCP/IP fields are stored. Then, a service scan is performed on the generated IP address through a handshake based on each protocol. Here, the service scan denotes performing a protocol-based handshake on a port that has performed an activation scan (an IP scan). For an efficiency of a scan step, scheduling may be performed.

Thereafter, information on each IoT device is generated using scan results. That is, an OS fingerprint is generated using information obtained by an IP scan. The OS fingerprint may be generated using TCP/IP field information extracted from an ack packet from a target IP address. Also, by using an IP scan result and a service scan result, banner information is extracted, and service version information and protocol communication history information may be created. Then, by using the banner information, the service version information, and the protocol communication history information, a report to be transmitted to an IoT device vulnerability analyzing apparatus may be generated.

The CPU usage, memory usage, transmission speed, and scan progress rate of the IoT device information gathering apparatus 10 are measured to monitor the performance of the IoT device information gathering apparatus 10 in each scan step. Also, for system management, processes performed in each scan step, generated files, resources, and information gathering state are managed.

FIGS. 3A through 3G are block diagrams illustrating the elements of the IoT device information gathering apparatus according to an exemplary embodiment of the present disclosure.

Figure 3A:
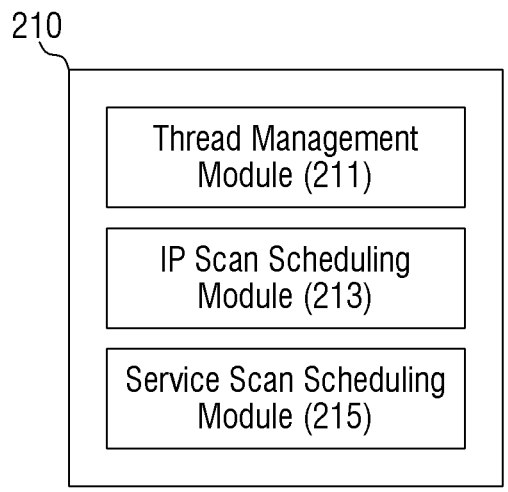
FIGS. 3A through 3G are block diagrams illustrating the elements of the IoT device information gathering apparatus according to an exemplary embodiment of the present disclosure.

FIG. 3A illustrates the internal structure of the scan scheduling module 210. Referring to FIG. 3A, the scan scheduling module 210 includes an IP scan scheduling module 213, a service scan scheduling module 215, and a thread management module 211, which operates the IP scan scheduling module 213 and the service scan scheduling module 215. In response to a multi-thread being generated by the thread management module 211, an IP scan and a service scan may be processed in parallel.

Figure 3B:
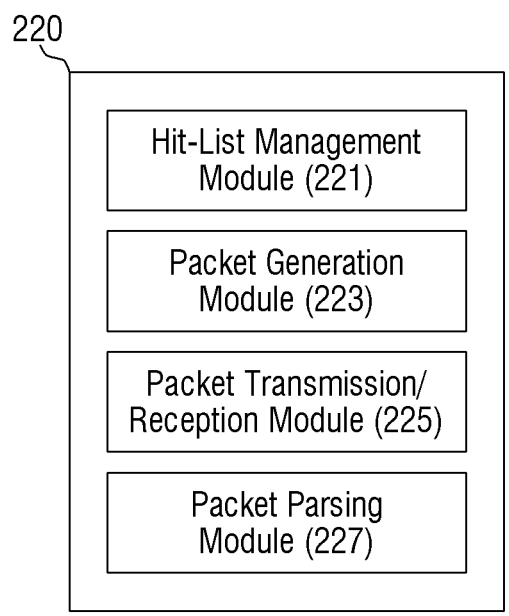

FIG. 3B illustrates the internal structure of the IP scanner 220. Referring to FIG. 3B, the IP scanner 220 may include a hit-list management module 221, which distinguishes IP addresses in a designated IP address range whose state has been checked from IP addresses in the designated IP address range whose state has not yet been checked. The IP scanner 220 adds the IP addresses whose state has been checked to a hit-list.

The IP scanner 220 may further include a packet generation module 223 and a packet transmission/reception module 225, which are for determining whether each randomly generated IP address is active, and a packet parsing module 227, which analyzes a response received from each randomly generated IP address. Here, IP addresses include both IPv4 addresses and IP version 6 (IPv6) addresses. Packets may be generated using various protocols such as, for example, TCP, User Datagram Protocol (UDP), and Internet Control Message Protocol (ICMP).

Figure 3C:
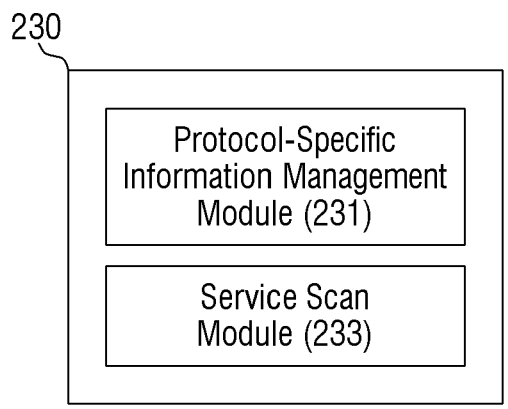

FIG. 3C illustrates the internal structure of the service scanner 230. Referring to FIG. 3C, the service scanner 230 may include a protocol-specific information management module 231 and a service scanning module 233, which identifies whether each port is active based on protocol-specific information, in order to identify each service provided by each port.

Ports that can be identified by the service scanner 230 include, for example, File Transfer Protocol (FTP), Secure Shell (SSH), TELNET, Simple Mail Transfer Protocol (SMTP), Domain Name System (DNS), HyperText Transfer Protocol (HTTP), Post Office Protocol version 3 (POP3), Internet Message Access Protocol (IMAP), Session Initiation Protocol (SIP), and Real Time Streaming Protocol (RTSP) ports. These ports are commonly used in applications to provide services and are as shown in Table 1 below.

TABLE 1

| Port | Application | Protocol |
|------|-------------|----------|
| 20   | FTP Data    | TCP      |
| 21   | FTP Control | TCP      |
| 23   | TELNET      | TCP      |
| 25   | SMTP        | TCP      |
| 60   | TFTP        | UDP      |
| 80   | HTTP        | TCP      |
| 110  | POP3        | TCP      |
| 194  | IRC         | TCP      |
| 443  | HTTPS       | TCP      |
| 520  | RIP         | UDP      |

The ports shown in Table 1 are referred to as well-known ports. Obviously, there are other ports than those shown in Table 1. That is, the ports shown in Table 1 are merely for a better understanding of the present disclosure.

The scan scheduling module 210, the IP scanner 220, and the service scanner 230 serve a scan function of the IoT device information gathering apparatus 10. The scan function refers to all processes for acquiring information on each IoT device.

An IP scan filters any active IP addresses to effectively perform a service scan. For an effective service scan, the IP scanner 220 may generate a hit-list and may perform an IP scan on a designated IP address range. Alternatively, the IP scanner 220 may perform an IP scan on an entire IPv4 address range and may generate a list of active IP addresses.

In order to create the list of active IP addresses, ZMap, which is an open source, may be used. ZMap is an open source available at the website "zmap.io" for gathering information on devices that can be accessed via the Internet. The IP scanner 220 may be realized based on ZMap to identify whether each IP address is active.

The service scanner 230 may perform a protocol-based handshake on an open port to obtain service and banner information. Here, the banner information is a welcome message. For example, the banner information may be a welcome message exposed when FTP is connected. A welcome message is analyzed because it contains information on a service.

To create a list of active ports, ZGrab, which is an open source, may be used. ZGrab is an open source available at the website "github.com/zmap/zgrab" and performs a scan on an application level in association with ZMap. The service scanner 230 may be realized based on ZGrab to identify whether each port is active.

For the efficiency of each scan step, a scheduling technique may be applied by the scan scheduling module 210. The ZMap open source, which is for realizing the IP scanner 220, and the ZGrab open source, which is for realizing the service scanner 230, are merely for a better understanding of the present disclosure, and the present disclosure is not limited thereto.

Figure 3D:
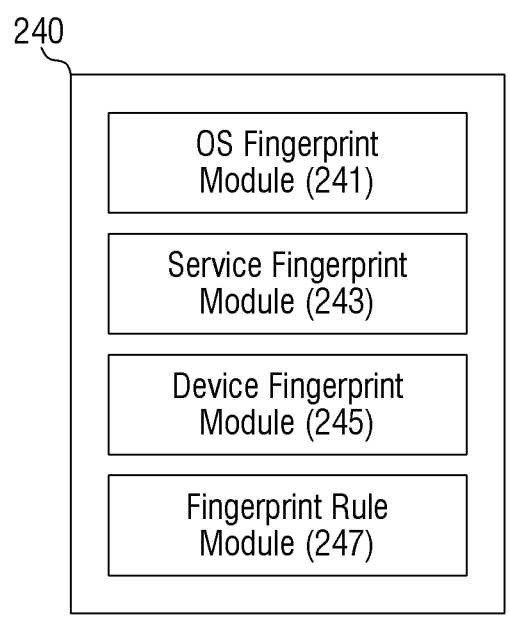

FIG. 3D illustrates the internal structure of the fingerprint generator 240. The fingerprint generator 240 may include an OS fingerprint module 241, a service fingerprint module 243, a device fingerprint module 245, and a fingerprint rule module 247.

The OS fingerprint module 241 may generate an OS fingerprint using an IP scan result, i.e., TCP/IP field information extracted from an ack packet. The service fingerprint module 243 may generate a service fingerprint using a service scan result, i.e., banner information of network traffic data.

Figure 3E:
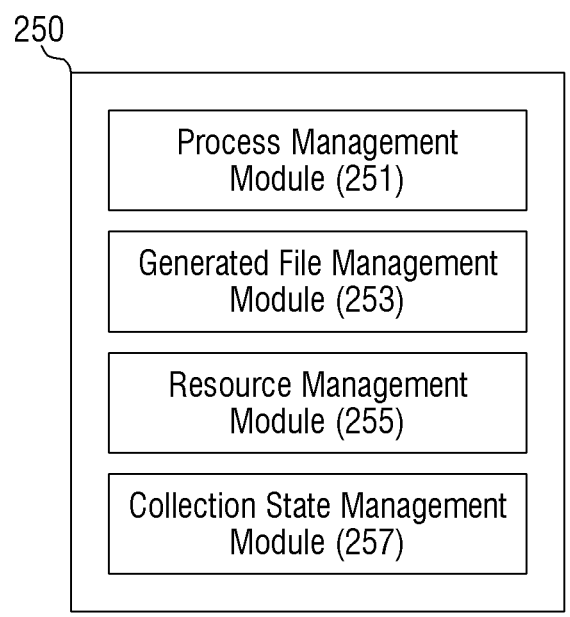

FIG. 3E illustrates the internal structure of the system manager 250. Referring to FIG. 3E, the system manager 250 includes a process management module 251, a generated file management module 253, a resource management module 255, a gathering state management module 257.

Figure 3F:
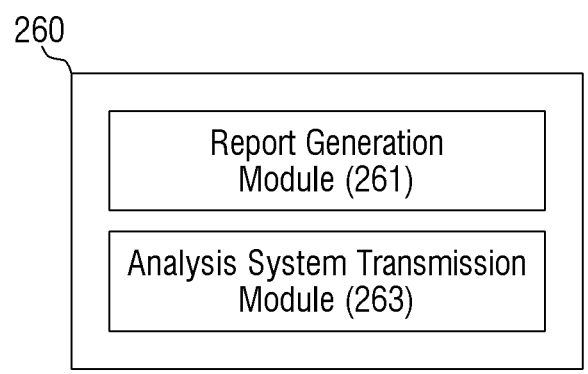

FIG. 3F illustrates the internal structure of the report generator 260. Referring to FIG. 3F, the report generator 260 may include a report generation module 261 and an analysis system transmission module 263. The report generation module 261 may generate an OS fingerprint and a service fingerprint in JSON format. The analysis system transmission module 263 may transmit the OS fingerprint and the service fingerprint, which are in JSON format, to an IoT vulnerability analyzing system.

Figure 3G:
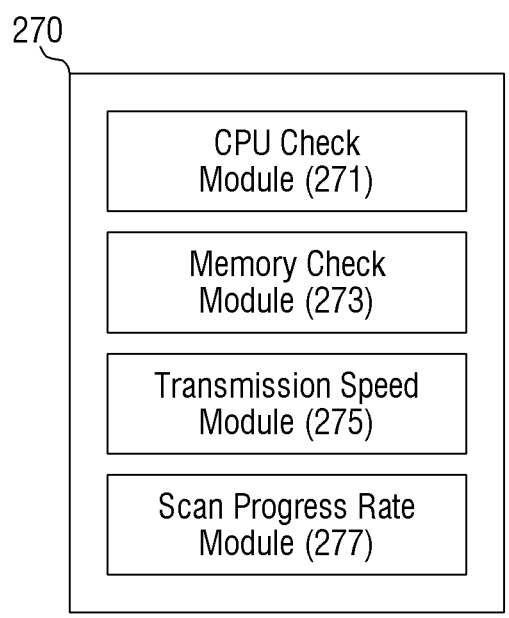

FIG. 3G illustrates the internal structure of the performance monitor 270. Referring to FIG. 3G, the performance monitor 270 may include a CPU check module 271, a memory check module 273, a transmission speed module 275, and a scan progress rate module 277.

The fingerprint generator 240 and the report generator 260 are for generating information. The system manager 250 and the performance monitor 270 are for a management function. The management function refers to performing system management and performance monitoring to perform a scan and to measure the performance of the IoT device information gathering apparatus 10. System management involves managing processes, resources and generated files for a smooth execution of each module.

Performance monitoring involves periodically checking CPU and memory usage and the amount of packets sent or received to measure the performance of the IoT device information gathering apparatus 10. Performance monitoring also involves checking the scan progress rate for a designated address range for an IP scan. If the designated address range is an entire IPv4 address range, the scan progress rate for the entire IPv4 address range may be checked.

Figure 4:
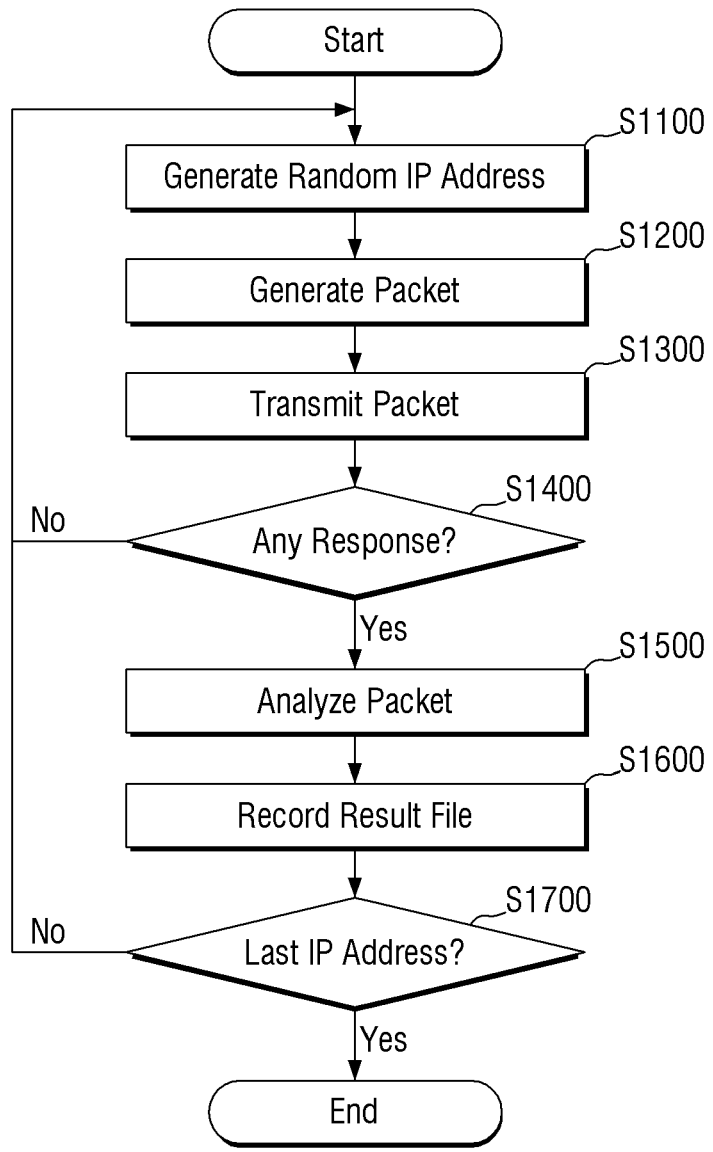
FIG. 4 is a flowchart illustrating an Internet Protocol (IP) scan method according to an exemplary embodiment of the present disclosure.

FIG. 4 is a flowchart illustrating an IP scan method according to an exemplary embodiment of the present disclosure.

Referring to FIG. 4, the IP scan method includes generating a random IP address to create a scan target, transmitting and receiving a scan packet, and interpreting a packet. That is, a packet is transmitted to a randomly generated IP address, and an IP scan is performed using a response packet (i.e., a syn-ack packet) and an IP address that is responsive.

Specifically, referring to FIG. 4, a random IP address is generated (S1100), and a packet to be transmitted to the generated IP address is generated (S1200). Thereafter, the generated packet is transmitted (S1300), and a response is waited for (S1400). If no response is received, the IP scan method returns to S1100 so that S1100, S1200, S1300, and S1400 are performed again.

On the other hand, if a syn-ack packet is received as a response (S1400), the received syn-ack packet is analyzed (S1500). Then, the result of the analysis is recorded in a scan result file (S1600). If the generated IP address is the last IP address, the IP scan method ends, and otherwise, the IP scan method returns to S1100 so that S1100, S1200, S1300, and S1400 are performed again.

Figure 5:
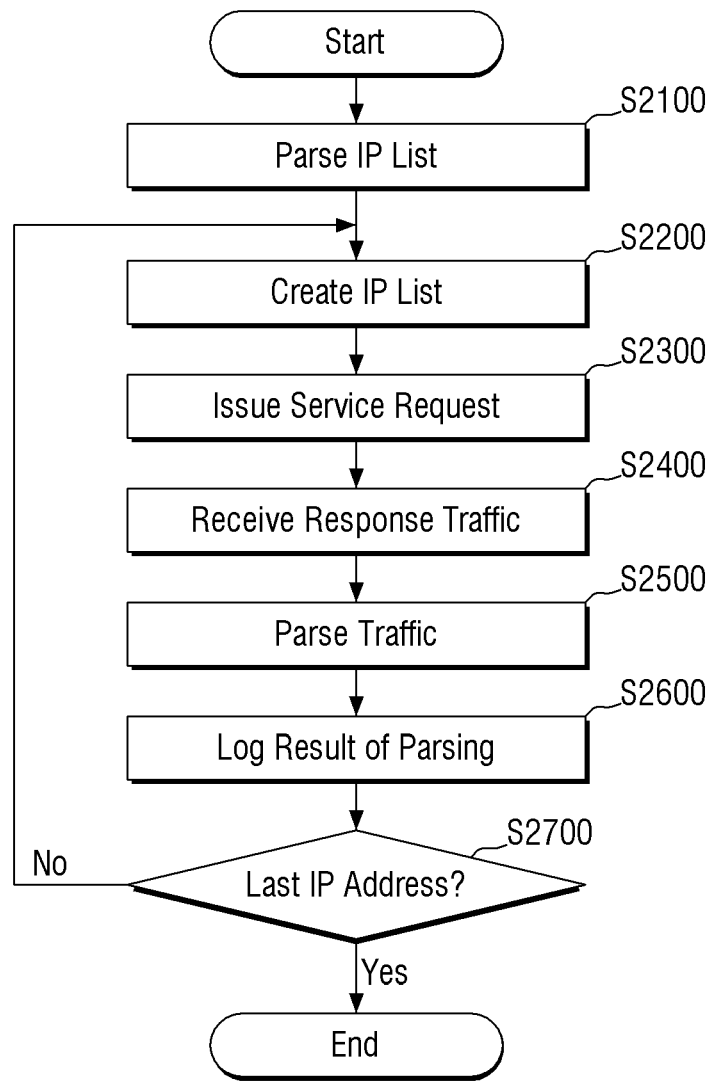
FIG. 5 is a flowchart illustrating a service scan method according to an exemplary embodiment of the present disclosure.

FIG. 5 is a flowchart illustrating a service scan method according to an exemplary embodiment of the present disclosure.

Referring to FIG. 5, the service scan method includes gathering information on an IoT device, through communication based on protocol properties, using a list of active IP addresses, which is an IP scan result. Specifically, the service scan method includes extracting an IP address from a hit-list, which is also an IP scan result, to create a list of IP addresses to be used in a service scan.

A service request is issued using a protocol corresponding to a port number set in advance for the extracted IP address, and response traffic is received as a response. Necessary data is extracted from the response traffic and is recorded in a log. In the service scan method, the list of active IP addresses, which is the result of the IP scan, and a port number to be service-scanned are received as input data, and a log is created for the corresponding port as a result of a service scan.

Specifically, referring to FIG. 5, a list of active IP addresses, which is an IP scan result, is parsed (S2100), and as a result, a list of IP addresses to be service-scanned is created (S2200). For each IP address included in the created list, a service request is issued using a protocol corresponding to each port to be service-scanned (S2300).

Response traffic for the service request is received (S2400), the received response traffic is parsed (S2500), and the result of the parsing is stored in a log (S2600). Thereafter, if the IP address for which the service request has been issued is the last IP address in the created list (S2700), the service scan method ends, and otherwise, the service scan method returns to S2200 and issues a service request for next IP address.

Figure 6:
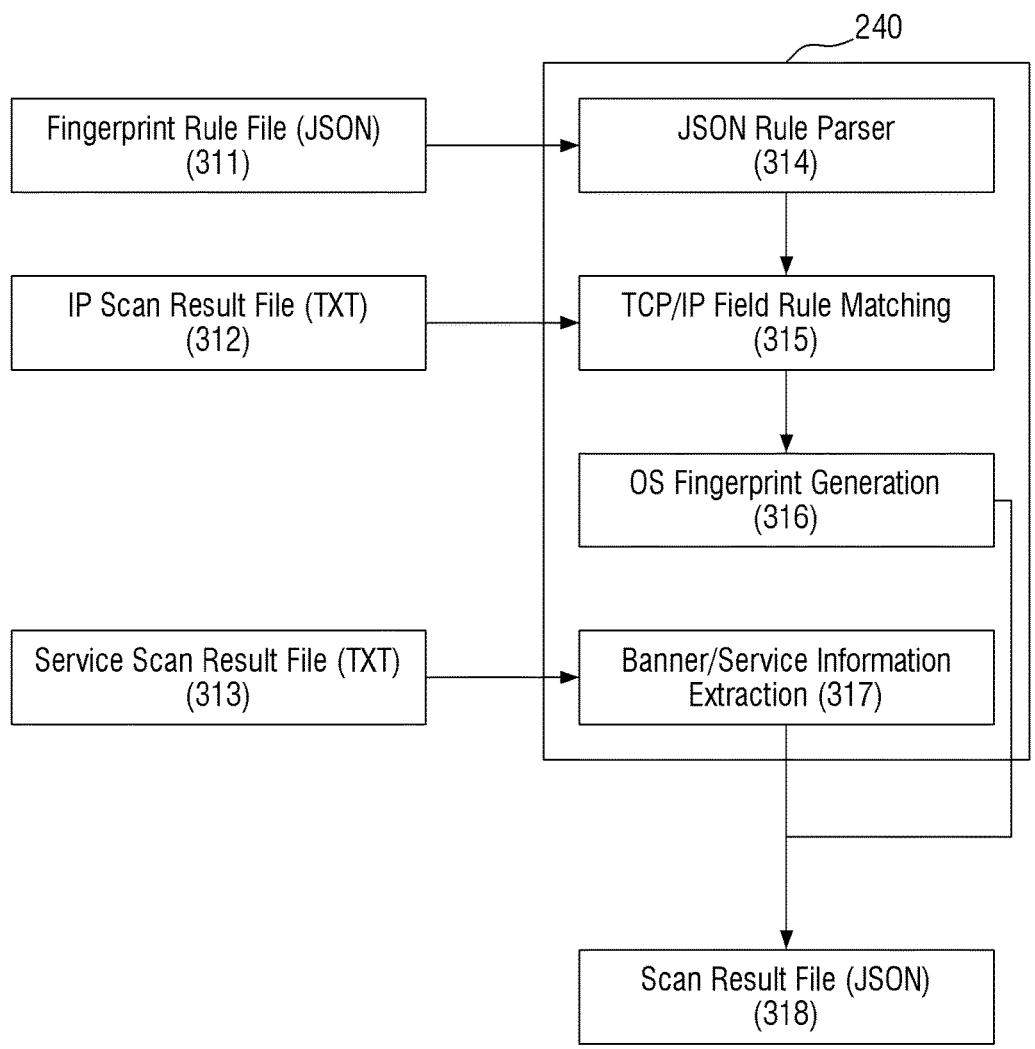
FIG. 6 is a schematic view illustrating a fingerprint generation method according to an exemplary embodiment of the present disclosure.

FIG. 6 is a schematic view illustrating a fingerprint generation method according to an exemplary embodiment of the present disclosure Referring to FIG. 6, the fingerprint generator 240 may use a fingerprint rule file 311, which is in JSON format, an IP scan result file 312, which is in TXT format, and a service scan result file 313, which is in TXT format, as input data. Obviously, the formats of the fingerprint rule file 311, the IP scan result file 312, and the service scan result file 313 are not particularly limited.

The fingerprint rule file 311 is parsed using a JSON rule parser 314, and the IP scan result file 312 is used in TCP/IP field rule matching 315 to generate an OS fingerprint 316. The service scan result file 313 is used in banner/service information extraction 317 to generate a service fingerprint. A service scan result file 318, which is in JSON format, is generated by combining the OS fingerprint and the service fingerprint.

FIG. 7 is a flowchart illustrating the fingerprint generation method according to an exemplary embodiment of the present disclosure.

Referring to FIG. 7, an OS fingerprint rule is loaded (S3100), and the loaded OS fingerprint rule is parsed (S3200). Thereafter, the parsed fingerprint rule and the values of TCP/IP fields, which are obtained as a result of an IP scan, are compared (S3300), and if the parsed fingerprint rule and the values of the TCP/IP fields match, an OS fingerprint is generated (S3400).

If the parsed fingerprint rule and the values of the TCP/IP fields do not match, an unknown result is produced (S3450). Thereafter, banner/service information is extracted using a log created as a result of a service scan (S3500), and the OS fingerprint and the banner/service information are stored (S3600).

Conventionally, whenever there is an OS version change, the format of the OS fingerprint should be changed, and as a result, an update of the OS fingerprint is needed. On the other hand, in the present exemplary embodiment, the OS fingerprint is generated based on a rule that is created in JSON format. Thus, a fingerprint can be automatically generated simply by adding a rule.

In addition, since the values of TCP/IP fields are interpreted in consideration with the OS of the IoT device information gathering apparatus 10 and a response from an IP address that has been service-scanned by the IoT device information gathering apparatus 10, the accuracy of detection of an OS can be enhanced (????).

It will hereinafter be described how to detect an OS based on the values of TCP/IP fields. Since values set in TCP/IP packets vary depending on the basic settings of an OS, an OS can be detected based on TCP/IP packets. The values of TCP/IP fields that are for detecting an OS are as shown in Table 2 below.

TABLE 2

| Classification | Description |
| --- | --- |
| Maximum Segment Size (MSS) | "MSS" refers to the maximum size of segments to be transmitted at once by OS. |
| Time To Live (TTL) | "TTL" refers to a value indicating how many routers a packet will survive and is used for preventing looping in a network. |
| Sliding Window Size | "Sliding window size" refers to the size of a sliding window, which is a TCP flow control technique. |
| TCP Options | "TCP Options" refer to options through TCP flag values. |

TABLE 2-continued

| Classification | Description |
| --- | --- |
| Packet Length | "Packet length" refers to the length of basic packets. |
| IP ID | "IP ID" refers to the identifier of each IP packet and is used to represent each fragmented individual packet. |

A method of detecting an OS based on the values of TCP/IP fields is as shown in Table 3 below. Specifically, Table 3 shows TCP/IP field values obtained by analyzing SYN packets, sent by each OS, with TCPDUMP.

TABLE 3

| OS | Linux | OpenBSD | Solaris7 | AIX 4.3 | WINDOWS 2000 |
| --- | --- | --- | --- | --- | --- |
| MSS | — | — | — | — | — |
| TTL | 64 | 64 | 255 | 64 | 128 |
| Window | 5840 | 16384 | 8760 | 16384 | 16384 |
| TCP Options | Set MSS Timestamps sackOK wscale and 1nop | Same as Linux wscale and 5nop | MSS | MSS | MSS sackOK 2nop |
| Packet Length | 60 | 64 | 44 | 44 | 48 |
| IP ID | — | Changes randomly | Increases by 1 | Increases by 1 | Increases by 1 |

Referring to Table 3, "sackOK" denotes a selective acknowledgement option, "wscale" denotes a window scale option, which is used to notify that TCP windows are capable of sending and receiving or to negotiate the size of the receive window, "Nop" is an option for setting TCP packets to be 4 bytes (or 8 bytes) long depending on an OS environment, and "timestamp" is for calculating delay. Delay is calculated based on the difference between the timestamps of both parties.

A further description of how to detect an OS based on the values of TCP/IP fields can be found at the website "nmap.org/nmap-fingerprinting-article.txt".

FIGS. 8A and 8B show an IP scan result and a service scan result that can be used in some exemplary embodiments of the present disclosure.

FIG. 8A shows an exemplary IP scan result file. The IP scan result file is a record of active IP addresses identified by scanning through a designated IP address range or scanning through an entire IPv4 address range if there is no designated IP address range. In the IP scan result file, active IP addresses and entire TCP/IP fields are recorded. The IP scan result file may be in the form of a CSV file.

FIG. 8B shows an exemplary service scan result file. A service scan result, like an IP scan result, may be recorded in JSON format. Since communication data may vary depending on the protocol of each port to be service-scanned, fields and data that are extracted may also vary. FIG. 8B shows a service scan result obtained by service-scanning port 23 of "TELNET".

FIGS. 9A and 9B show an OS fingerprint and a scan result report that can be used in some exemplary embodiments of the present disclosure.

Specifically, FIG. 9A shows an exemplary OS fingerprint generated based on a rule. A fingerprint result is an IP-specific OS fingerprint generated by matching an IP scan result with a fingerprint rule. The fingerprint result is generated in JSON format and is readily inserted into a report file.

Referring to FIG. 9B, a scan result report is generated by combining an IP scan result, a service scan result, and fingerprint data. The scan result report includes OS fingerprint information, service banner information, and a timestamp. The scan result report is generated in JSON format.

FIGS. 10A and 10B show a rule for generating an OS fingerprint and a fingerprint result obtained by the rule.

Specifically, FIG. 10A shows the rule of an OS fingerprint generated in JSON format. For example, if the value of TTL for IP is 128 and the value of window_size for TCP is 8192, the corresponding OS is determined to be WINDOWS 7, and if the value of TTL for IP is 128, the value of window_size for TCP is 65535, and the value of MSS for TCP is 512, the corresponding OS is determined to be FREEBSD. However, the present disclosure is not limited to this example, and the rule for detecting WINDOWS 7 may have different values than those set forth herein.

A rule for detecting an application may also be created in JSON Format. For example, if a particular value is included in a handshake packet, the corresponding port is determined to be the HTTP port (port 80), particularly, Apache 2.3. Also, if a particular value is included in a handshake packet, the corresponding port is determined to be the SIP port (port 5060), particularly, OpenSIP.

A service fingerprint may be generated by analyzing a service scan result in a similar rule-based manner to that used to generate an OS fingerprint using an IP scan result, and the result thereof may be as shown in FIG. 10B. Referring to FIG. 10B, the IP address 74.116.246.162 uses FREEBSD as its OS and provides a service via the TELNET port.

The concepts of the invention described above with reference to FIGS. 3 to 7 can be embodied as computer-readable code on a computer-readable medium. The computer-readable medium may be, for example, a removable recording medium (a CD, a DVD, a BLU-RAY disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A device information gathering method comprising:
allowing a device information gathering apparatus to transmit a packet to a randomly generated Internet Protocol (IP) address and to receive a syn-ack packet as a response;
allowing the device information gathering apparatus to parse the syn-ack packet and thus to extract Transmission Control Protocol (TCP)/IP fields;
allowing the device information gathering apparatus to compare the TCP/IP fields and an Operating Systems (OS) fingerprint rule, which is in JavaScript Object Notation (JSON) format, and thus to generate an OS fingerprint of the randomly generated IP address,
wherein the OS fingerprint rule stores TCP/IP field value corresponding to OS and version of the OS as attribute-value pair;
allowing the device information gathering apparatus to transmit a packet corresponding to the protocol of a predetermined port of the randomly generated IP address to the predetermined port and to receive traffic as a response;
allowing the device information gathering apparatus to extract banner information and service information from the traffic; and
allowing the device information gathering apparatus to compare the banner information and the service information with a service fingerprint rule, which is in JSON format, and thus to generate a service fingerprint of the predetermined port,
wherein the service fingerprint rule stores value of the banner information and the service information corresponding to application providing service and version of the application as attribute-value pair.

2. The device information gathering method of claim 1, wherein the port is one of File Transfer Protocol (FTP), Secure Shell (SSH), TELNET, Simple Mail Transfer Protocol (SMTP), Domain Name System (DNS), HyperText Transfer Protocol (HTTP), Post Office Protocol version 3 (POP3), Internet Message Access Protocol (IMAP), Session Initiation Protocol (SIP), and Real Time Streaming Protocol (RTSP) ports.

3. The device information gathering method of claim 1, further comprising:
allowing the device information gathering apparatus to provide the OS fingerprint and the service fingerprint in JSON format.

4. The device information gathering method of claim 1, further comprising:
allowing the device information gathering apparatus to schedule the transmission of a packet corresponding to the protocol of the predetermined port to the predetermined port.

5. The device information gathering method of claim 1, further comprising:
allowing the device information gathering apparatus to schedule the transmission of a packet to the randomly generated IP address.

6. A device information gathering method comprising:
allowing a device information gathering apparatus to transmit a packet to a randomly generated Internet Protocol (IP) address and to receive a syn-ack packet as a response;
allowing the device information gathering apparatus to parse the syn-ack packet and thus to extract Transmission Control Protocol (TCP)/IP fields; and
allowing the device information gathering apparatus to compare the TCP/IP fields and an Operating Systems (OS) fingerprint rule, which is in JavaScript Object Notation (JSON) format, and thus to generate an OS fingerprint of the randomly generated IP address, wherein the OS fingerprint rule stores TCP/IP field value corresponding to OS and version of the OS as attribute-value pair, and wherein the allowing the device information gathering apparatus to transmit a packet to the randomly generated IP address and to receive a syn-ack packet as a response, comprises randomly generating an IP address belonging to a first IP address range and adding the randomly generated IP address to a hit-list for the first IP address range.

7. A device information gathering apparatus comprising:

an IP scanner transmitting a packet to a randomly generated IP address and receiving a syn-ack packet as a response;

a fingerprint generator extracting TCP/IP fields by parsing the syn-ack packet, the fingerprint generator generating an OS fingerprint of the randomly generated IP address by comparing the TCP/IP fields and an OS fingerprint rule, which is in JSON format, wherein the OS fingerprint rule stores TCP/IP field value corresponding to OS and version of the OS as attribute-value pair; and a service scanner transmitting a packet corresponding to the protocol of a predetermined port of the randomly generated IP address to the predetermined port and receiving traffic as a response, wherein the fingerprint generator extracts banner information and service information from the traffic and generates a service fingerprint of the predetermined port by comparing the banner information and the service information with a service fingerprint rule, which is in JSON format, and the service fingerprint rule stores value of the banner information and the service information corresponding to application providing service and version of the applications as attribute-value pairs.

8. The device information gathering apparatus of claim 7, further comprising:

a scheduler scheduling the transmission of a packet to the randomly generated IP address and the transmission of a packet corresponding to the protocol of the predetermined port of the randomly generated IP address to the predetermined port.

* * * * *